(12) United States Patent
Kempf et al.

(10) Patent No.: US 10,969,268 B2
(45) Date of Patent: Apr. 6, 2021

(54) WEIGHING SCALE WITH A TOUCHSCREEN DISPLAY INCORPORATED IN THE LOAD RECEIVER PLATFORM SURFACE

(71) Applicant: Mettler-Toledo (Albstadt) GmbH, Albstadt (DE)

(72) Inventors: Edgar Kempf, Inzigkofen (DE); Alexander Witt, Balingen (DE); Walter Ehresmann, Albstadt (DE); Denis Huber, Albstadt (DE)

(73) Assignee: Mettler-Toledo (Albstadt) GmbH, Albstadt (DE)

( * ) Notice: Subject to any disclaimer, the term of this patent is extended or adjusted under 35 U.S.C. 154(b) by 0 days.

(21) Appl. No.: 16/609,791

(22) PCT Filed: Feb. 27, 2018

(86) PCT No.: PCT/EP2018/054784
§ 371 (c)(1),
(2) Date: Oct. 31, 2019

(87) PCT Pub. No.: WO2018/158236
PCT Pub. Date: Sep. 7, 2018

(65) Prior Publication Data
US 2020/0056929 A1      Feb. 20, 2020

(30) Foreign Application Priority Data
Mar. 2, 2017   (EP) .................................... 17158831

(51) Int. Cl.
*G01G 3/14*      (2006.01)
*G01G 23/37*     (2006.01)
(Continued)

(52) U.S. Cl.
CPC .......... *G01G 19/415* (2013.01); *G01G 3/1402* (2013.01); *G01G 23/3721* (2013.01); *G06Q 20/208* (2013.01)

(58) Field of Classification Search
CPC ............. G01G 23/3721; G01G 19/415; G01G 3/1402; G06Q 20/208
(Continued)

(56) References Cited

U.S. PATENT DOCUMENTS

| 4,506,746 A | 3/1985 | Lockery |
| 7,186,930 B1 | 3/2007 | Wong et al. |

(Continued)

FOREIGN PATENT DOCUMENTS

ES   1072311   * 6/2010 ............. G01G 19/18

*Primary Examiner* — Jacques M Saint Surin
(74) *Attorney, Agent, or Firm* — Standley Law Group LLP; Jeffrey S. Standley; Stephen L. Grant (57) ABSTRACT

A weighing scale (1) for a retail store counter includes a housing (2), a load-receiving platform (3) on top of the housing, and operating components (27) enclosed therein, including a weighing cell (24). A load-transmitting mechanical connection (25) couples the weighing cell to the load-receiving platform. Analog and digital weighing electronics convert electrical weight signals of the weighing cell into digital weighing results. A touchscreen display panel (7, 22, 23) interacts with a human operator, and is configured as a layered assembly with a liquid crystal display (23), a projected capacitive (PCAP) touch screen (22) with a plurality of touch-sensing points, and a protective glass plate (21) on top of each other. The layered assembly is integrated horizontally in the load-receiving platform facing the human operator. The top surface operates as a load-receiving surface (45) a touch field keyboard (40, 41, 42, 47) and a display window (43, 46, 48).

16 Claims, 6 Drawing Sheets

(51) Int. Cl.
*G06Q 20/20* (2012.01)
*G01G 19/415* (2006.01)

(58) Field of Classification Search
USPC .............................................. 177/1
See application file for complete search history.

(56) References Cited

U.S. PATENT DOCUMENTS

| | | |
|---|---|---|
| 8,610,007 B2 | 12/2013 | Chen |
| 9,092,050 B2 | 7/2015 | Amada et al. |
| 9,410,841 B2 | 8/2016 | Collins, Jr. et al. |
| 2011/0297455 A1 | 12/2011 | Chen |
| 2012/0000714 A1* | 1/2012 | Weisz ................ G06Q 30/0225 177/25.15 |
| 2012/0000976 A1* | 1/2012 | Rollyson .............. G06Q 20/208 235/375 |
| 2012/0000978 A1* | 1/2012 | Rollyson ................ G06Q 30/06 235/383 |
| 2014/0089231 A1 | 3/2014 | Jhunja et al. |
| 2014/0263631 A1* | 9/2014 | Muniz ................ G01G 19/4144 235/383 |
| 2016/0084698 A1* | 3/2016 | Kontschak ............ G01G 19/18 177/263 |

\* cited by examiner

WEIGHING SCALE WITH A TOUCHSCREEN DISPLAY INCORPORATED IN THE LOAD RECEIVER PLATFORM SURFACE

The present invention relates to a weighing scale for use in retail stores, for example for food products such as meats, cheeses, fish, pastries, chocolates and many other food items that are openly displayed on a store counter and sold in different weight quantities as requested by individual customers. Scales of this kind are often set up on the same store counter on which the merchandise is displayed, typically at a height of about 90 cm from the floor, and they are typically equipped with a pole-mounted, elevated touchscreen/display panel. From user comments, the applicants have found that the pole-mounted display obstructs the shopper's view of the merchandise on the scale and stands in the way if the vendor needs to reach for goods behind the scale.

As a solution, one could consider a scale with a touchscreen/display panel that is attached to the base housing instead of pole-mounted, but this kind of scale generally has a smaller touchscreen/display area which does not allow as much information to be displayed as a pole-mounted display panel. Also, it would be desirable to minimize the footprint area occupied by the scale on the countertop surface in order to free up more space for merchandise.

The present invention is directed at a concept for incorporating the display and the touchscreen in the horizontal surface of the load-receiving platform of the scale and thereby providing a large touchscreen/display panel that does not obstruct the airspace above the scale nor take up surface space on the scale counter.

Examples of weighing scales in which at least some control and display functions are integrated in the load-receiving platform can be found in the existing state of the art. An electronic bathroom scale as described in U.S. Pat. No. 7,186,930 has a load-receiving platform that includes a display screen and is also capable of interacting with the user. For example, tapping the platform briefly causes the scale to be switched on; keeping a foot on the platform causes the display to show a cyclic sequence of options such as identification numbers and stored weighing results for different users. Removing the foot from the platform freezes the display in the momentarily displayed mode, and tapping the platform again briefly activates the scale in the displayed mode. In analogous manner, the scale can also allow other entry and display functions such as entering the body height, gender and age of a user and displaying the user's body mass index.

A weighing platform that is part of a checkout station and simultaneously functions as scanner window, load-receiving surface, display screen and keyboard-style touch input device is presented U.S. Pat. No. 9,092,050 B2. The load-receiving surface is a rectangular glass plate which is supported by four load cells at its corners. The screen display is realized as a projected image generated by rear projection from an optical projector onto the frosted bottom surface of the glass plate. To perform the touch-sensing function, the glass plate is traversed by infrared rays which originate from light-emitting diodes at the edge of the glass plate and produce an infrared image on the downward facing glass surface which is captured by a camera and analyzed by a processor. As the IR image is modified by touching the top surface, the screen fields that are being touched can be identified by the processor.

Another combination of a weighing platform with an integrated touchscreen display and scanner is described in U.S. Pat. No. 9,410,841 B2. The load-receiving surface is again a rectangular glass plate which is supported at its corners by four load cells that are mounted on the chassis structure of a checkout station. A color LCD screen is arranged below the rectangular glass plate, separately supported on a chassis structure, with a sufficient gap to avoid any contact between the top surface of the color LCD screen and the bottom surface of the glass plate. To perform the touch-sensing function, a processor analyzes the individual force signals from the four load cells and calculates the point of application of a contact force of the operator's finger on the glass plate. Alternatively, an infrared touch-sensing arrangement is proposed, similar to the preceding example.

The two preceding examples of U.S. Pat. Nos. 9,092,050 and 9,410,841 relate to a combined scale/touchscreen/display/scanner arrangement designed specifically for use in a checkout terminal. Because of the scuffing and scratching of the glass plate which occurs when articles such as canned goods and bottled beverages are dragged across the surface, U.S. Pat. No. 9,410,841 in column 1, lines 29-32 advises that as a result of this scratchy environment, approaches to building a touchscreen display into the scanner scale arrangement such as resistive or capacitive touch sensing approaches are not sufficiently robust". Thus, the use of a commercially available resistive or capacitive touchscreen/display unit is expressly ruled out.

However, the present invention is directed at a device that is used exclusively for weighing, as opposed to the combined weighing/scanning platforms used in retail checkout terminals where merchandise items, including hard objects such as canned goods, glass jars and bottles, are dragged across the weighing/scanning surface of the terminal. The concerns about scuffing and scratching the weighing surface by sliding hard objects across it are therefore not applicable to the kind of weighing scale envisioned by the present invention. At least in regard to this aspect of scuffing and scratching of the weighing platform, a weighing scale with a touchscreen display incorporated in the weighing platform should therefore not be ruled out as a solution to the problem stated in the introductory paragraph.

The prior art that has been reviewed by the applicants includes proposals to incorporate a weighing capability in a portable electronic device such as a smartphone or tablet computer, so that an object can be weighed by laying the tablet or smartphone face-up on a table or other level surface and setting the weighing object on the touchscreen/display which does double duty as a weighing platform. For example, in US 1022/0297455 A1 a "portable electronic device and method for measuring weight utilizing the same" are proposed in the form of a general block diagram concept which includes a weight sensor (block 40 of the block diagram) that is "operable to detect the weight of an object placed on the touch panel." It is further disclosed (without details or drawings) that "in one embodiment, the weight sensor 40 is a pressure sensor connected to the touch panel 20. When the object is placed on the touch panel 20, the pressure sensor can determine the weight of the object".

To cite another example, in US 2014/0089231 "multi-function portable computing devices capable of functioning as digital scales" are described, wherein "for example, an object may be placed on the screen of a stationary smartphone, which in turn will calculate and display the weight of said object". Specifically claimed is a weighing accuracy of 0.1% of the weight of the object. As a disclosure of how this weighing capability might be realized, a "Flexiforce™ A201" force sensor is mentioned. However, according to the specifications published on the manufacturer's website, this sensor has repeatability, hysteresis and drift data of 2.5% or more, which would make a claimed accuracy of 0.1% highly unrealistic.

Based on the sketchy disclosure of the technical principles proposed to realize this weighing capability in the case of US 1022/0297455 A1 and based on the weighing performance data mentioned in US 2014/0089231, the applicant came to the conclusion that the concept of incorporating a weight sensor in the touchscreen display of a tablet or smartphone is not applicable to the subject of interest in the present case, i.e. a weighing scale for use in retail stores. Virtually anywhere in the world, weighing scales for use in retail stores are subject to government regulations which are generally modeled after Recommendation R-76 of OIML (Organisation Internationale de Metrologie Legale). According to the requirements prescribed by OIML R-76, a typical electronic retail scale with a weighing capacity of e.g., 6000 grams and a digital display increment of d=2 grams has to be accurate within ±½ d=±1 gram for weighing loads from zero to 1000 grams.

Consequently, rather than attempting to incorporate a weight sensor in a touchscreen device, the converse approach was taken, i.e. incorporating the touchscreen device in the load-receiving platform of the weighing device, using a proven design of a weighing scale and incorporating a touchscreen display (or a tablet computer with a touchscreen display) of a likewise proven design into the load-receiving platform. A critical aspect of such a combination lies in the power and data transmission between the movable part of the weighing scale, i.e. the load-receiving platform which contains the touchscreen display or tablet, and the stationary part or chassis base of the weighing scale in which the power supply, the load cell with its associated circuitry, and possibly other device modules such as a printer are installed. The seemingly simple and obvious solution of arranging one or more cables between the movable part and the stationary part introduces a secondary path of force propagation between the weighing platform and the chassis base of the weighing scale, also referred to as a bypass force or shunt force that superimposes itself on the weighing force which runs along the primary force propagation path through the one or more weighing cells. In particular the plastic insulation or foil carrier material of a cable can thus introduce a hysteresis error into the weighing result. Consequently, particular attention needs to be paid to a design of this electrical connection which keeps weighing errors resulting from the bypass forces within acceptable limits, i.e. within the aforementioned tolerance range of ±½ d.

The object of the present invention is to provide a weighing scale with a touchscreen display integrated in the load receiver platform surface, in particular for use in a retail store where the weighing scale is set up on a counter or table. The aim is to propose a design where the installation of the touchscreen/display device in the load receiver platform does not negatively affect the weighing accuracy in comparison to state-of-the-art retail weighing scales. A secondary goal is to provide at least the same level of functionality on the integrated touchscreen display in the load receiver platform surface as in a current retail counter scale with a pole-mounted keyboard/display panel and to realize this objective efficiently and economically by using available building blocks and components.

A weighing scale according to the invention for use on a retail store counter has a housing, a load-receiving platform that is arranged on top of the housing, and operating components that are enclosed in the housing. The operating components include at least one weighing cell that is coupled to the load-receiving platform through a load-transmitting mechanical connection, analog and digital weighing electronics that convert electrical weight signals of the at least one weighing cell into digital weighing results, and a central processing unit which lends program-controlled functionality to the weighing scale. The weighing scale is equipped with a touchscreen display panel which can display information to, and receive input from, a human operator. In the touchscreen display panel a liquid crystal display, a projected capacitive (PCAP) touch screen with a plurality of touch-sensing points and a protective glass plate are layered on top of each other. According to the invention, at least a part of the touchscreen display arrangement is integrated in the load-receiving platform in horizontal orientation with a top surface of the glass plate exposed and facing the human operator. The design of the touchscreen display arrangement includes constructive features to prevent the occurrence of weighing errors due to mechanical bypass forces that may be caused by electrical connections between the at least one part of the touchscreen display panel that is integrated in the load-receiving platform and the operating components that are installed in the housing. Furthermore, the top surface of the protective glass plate is designed to serve three functions, namely a first function as load-receiving surface of the weighing scale on which merchandise to be weighed can be placed by the human operator, a second function as touchscreen surface through which inputs are communicated to the weighing scale by the human operator, and a third function as display window through which information is delivered by the weighing scale to the human operator. Consequently, the top surface of the protective glass plate presents itself as a combined load-plate/touchscreen/display panel.

The weighing scale according to the invention avoids the drawbacks of existing countertop scales mentioned above in the introductory paragraph: it gives the customer an unobstructed view of the merchandise on the weighing platform, it allows the store clerk free access to reach for goods located behind the weighing scale, and the footprint area occupied by the scale on the countertop surface is minimized. These advantages are realized by starting from an existing design of a retail scale which meets the legally mandated accuracy requirements and then adding the concept of a combined load-plate/touchscreen/display panel, wherein the problem of mechanical bypass forces is addressed by the invention as will be further described hereinafter. Consequently, the weighing scale with the combined load-plate/touchscreen/display panel according to the invention will deliver an undiminished level of weighing accuracy that complies with regulatory requirements, in contrast to the aforementioned prior art of US 1022/0297455 A1 and US 2014/0089231 A1, both of which propose the reverse approach, i.e. starting with a tablet or smartphone and incorporating a weight sensor to provide a weighing capability as an added convenience feature which falls outside the realm of regulatory Weights and Measures requirements.

According to a preferred embodiment of the invention, the constructive features to prevent errors due to mechanical bypass forces that are introduced by electrical connections are realized in the form of one or more flexible electrical conductors between the load-receiving platform and the stationary operating components that are installed in the housing, wherein the flexible conductor is configured as a spring element with a an elastic restoring force that superimposes itself on the weighing force in a predictable and reproducible manner so that the influence of the flexible conductor will be cancelled in a calibration of the weighing scale.

As an example and without implying any limitation, the flexible conductor could be realized in the form of a plurality of conductive traces imbedded in a flat ribbon that is suspended between a solid attachment to the load-receiving part and a solid attachment to a chassis-based part of the weighing scale. As another possibility, the flexible conductor could be realized in the form of one or more helix springs extending vertically between a solid attachment to the load-receiving part and a solid attachment to a chassis-based part of the weighing scale.

According to another preferred embodiment of the invention, the constructive features to prevent errors due to mechanical bypass forces that are introduced by electrical connections are realized in the form of an arrangement wherein the protective glass plate is integrated in the load-receiving platform while the PCAP touch screen and the liquid crystal display are installed in a fixed position relative to the housing, separated by a small air gap from the glass plate. As the applicant has found through experiments, it is feasible to provide PCAP touch screens that are responsive to finger touch even across an air gap and a glass cover plate.

In a further preferred embodiment, in which the protective glass plate, the PCAP touch screen and the liquid crystal display are integrated in the load-receiving platform, the constructive features to prevent errors due to mechanical bypass forces that are introduced by electrical connections are realized in the form of wireless sending and receiving means for a wireless transmission of power and data between the load-receiving platform and the operating components that are installed in the housing.

Advantageously, the central processing unit of the weighing scale according to the invention possesses the capabilities to receive and process the digital weighing results from the weighing electronics, to receive and process operator inputs in the form of touchscreen entries, and to generate alphanumerical and pictorial displays of information on the load-plate/touchscreen/display panel. In particular, the central processing unit can be programmed to distinguish between intentional touchscreen inputs by the operator and unintended touchscreen actions resulting from a load being placed on the load-receiving platform.

In an advantageous embodiment of the invention, the capability to distinguish between intentional touchscreen inputs by the operator and unintended touchscreen actions resulting from a load being placed on the load-receiving platform scale can be realized through a program in the central processing unit which is operable to ignore touchscreen inputs from one or more of the touch-sensing points after the presence of a stable load on the load-receiving platform has been detected by the at least one weighing cell and/or after said one or more touch-sensing points have been touched for a duration exceeding a predetermined time limit.

Importantly, according to the invention the central processing unit can control the load-plate/touchscreen/display panel according to two different operating modes, as follows: In a first mode or operator input mode, a full-screen image of a user interface with a touch-field array is presented on the load-plate/touchscreen/display panel. The operator can enter inputs by touching different touch fields which can be identified by pictorial symbols, written words, numbers, letters and symbols. In a second mode or weighing mode, a two-part image is presented on the load-plate/touchscreen/display panel, wherein a first part of the load-plate/touchscreen/display panel is visually defined as load-receiving area for the merchandise to be weighed, and a second part contains an operator display window for information that is generated by the weighing scale in the weighing mode, including in particular weight and price to be paid for the merchandise that is currently being weighed on the scale.

In an advantageous embodiment of the second mode or weighing mode, the load-receiving area for the merchandise to be weighed is visually defined by a screen image of a metallic steel platform surface.

Advantageously in a further development of the preceding embodiment, the second part additionally includes one or more touch fields for operator inputs that are relevant to the weighing mode, including in particular a "Print" field for sending a print command to a label printer that is operatively connected to the weighing scale, a "Tare" field for cancelling out the weight of packaging material or a container, and a "Clear" field for commanding the weighing scale to return to the operator input mode.

In a further variant of the preceding embodiments, the display area for information that is generated by the weighing scale in the weighing mode additionally includes a customer display window arranged upside-down in relation to the operator display window and operable to display information that is relevant to the customer, including in particular the weight, the unit price, and the price to be paid for the selected quantity of merchandise on the weighing scale.

As an alternative to the customer display window of the preceding embodiment, an additional, separate display unit is attached to the body of the weighing scale on the side that faces the customer, for the purpose of displaying information that is generated by the weighing scale in the weighing mode and is relevant to the customer, including in particular the weight, the unit price, and the price to be paid for the selected quantity of merchandise on the weighing scale. As another alternative, a digital projector could be attached to, or integrated in, the weighing scale according to the invention in order to generate a projected image of the information of interest to the customer, for example on the glass surface of a display case behind which the weighing scale is set up.

Advantageously, in a weighing scale according to the invention the central processing unit is programmed to activate the operator input mode on start-up and every time after a previous transaction has been completed, but in either case only if no load on the load-receiving platform is detected by the at least one weighing cell.

Analogously, the central processing unit is programmed to activate the weighing mode after touchscreen entries by the operator in the operator input mode have been completed. As described above, the load-plate/touchscreen/display panel presents itself as a touchscreen when the weighing scale is in input mode and as a load-receiving platform with weight/price display and Tare/Print/Clear keys when the weighing scale is in weighing mode. The sequence of steps in a weighing transaction—(1) entering a product identification, (2) placing the selected article on the weighing platform, and (3) printing a label—is therefore intuitive and self-explanatory for the operator.

Continuing the train of thought of the inventive concept, at least some of the analog and/or digital operating components, including in particular the central processing unit, could be incorporated in the load-receiving platform together with the touchscreen display. In an advantageous embodiment of a weighing scale according to the invention, a commercially available tablet computer is integrated in the weighing platform and programmed to perform all of the digital processing functions of the weighing scale including the receiving and processing of digital weighing results from one or more appropriately equipped weighing cells, displaying and controlling the touch keyboard and display, and interacting with a printer, while the screen surface of the tablet computer also serves as load-receiving surface of the weighing scale according to the invention. To prevent errors due to the aforementioned mechanical bypass forces that can be introduced by electrical connections, the transmission of power and data can be realized through the constructive features described previously herein. Alternatively, the commercially available tablet computer could also be powered by its built-in battery, and the transmission of the digital weighing results from one or more weighing cells as well as the data exchange with external devices could be realized by using the built-in networking capabilities of the tablet computer.

In preferred embodiments of the weighing scale according to the invention, the load-transmitting mechanical connection between the weighing platform and the at least one weighing cell contains a hinge which allows the load-plate/touchscreen/display panel to be raised and lowered like a hinged lid on the enclosure of the weighing scale. This arrangement allows convenient access to the internal components of the weighing scale without the need to disconnect the load-plate/touchscreen/display mechanically and electrically from the internal components. As a particular advantage, the hinged connection of the platform allows a service technician to conveniently perform function checks on the touchscreen display while working on the internal components of the weighing scale.

In a preferred embodiment of the weighing scale according to the invention, the load-receiving area (45) is visually defined by a screen image of a metallic steel platform surface.

The dual use of the scale platform as touchscreen display and as load-receiving surface imposes a sequential order on the steps in a weighing transaction between an operator and a customer, which can be stated as follows:

Step 1: The operator ascertains that the scale is in operator input mode.

Step 2: The operator enters required data through the touchfield array which is presented on the load-plate/touchscreen/display panel. When the data entry has been completed, the weighing scale changes to the weighing mode.

Step 3: The operator places the merchandise selected by the customer on the load-receiving area of the load-plate/touchscreen/display panel.

Step 4: After taking note of the weight/price information displayed in the customer display window or the additional customer display unit, the customer approves, requests an adjustment of the merchandise quantity, or declines the transaction, whereupon the process continues, respectively, at step 5, 6, or step 7.

Step 5: The operator presses the "Print" field, the operatively connected printer delivers a label, the operator removes the merchandise from the weighing platform and affixes the label to it, and the weighing scale returns to the operator input mode.

Step 6: The operator adjusts the merchandise quantity and the process continues at step 4.

Step 7: The operator removes the merchandise from the weighing platform and presses the "Clear" field on the load-plate/touchscreen/display, whereupon the weighing scale returns to the operator input mode The weighing scale according to the invention will be described hereinafter through embodiments shown schematically in the drawings, wherein.

Figure 1:
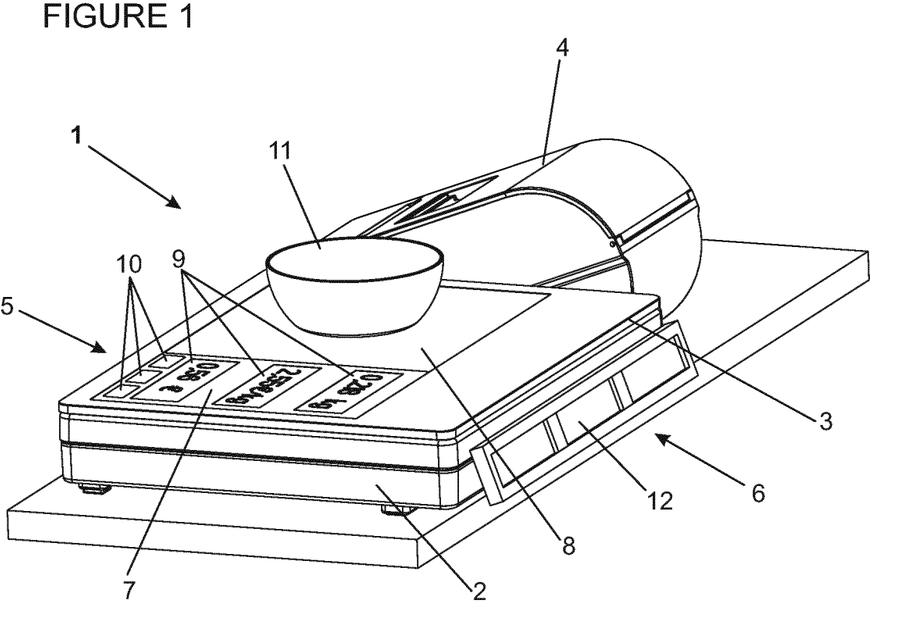
FIG. 1 shows a perspective view of a weighing scale according to the invention.

FIG. 1 shows a weighing scale 1 according to the invention with a housing 2, a load-receiving platform 3 and an attached printer 4. The weighing scale 1 has an operator side 5 facing leftward and a customer side 6 facing to the right in relation to this drawing. A touchscreen/display panel 7 is integrally incorporated in the load-receiving platform 3, forming a combined load-plate/touchscreen/display panel 3, 7. In the illustrated situation, the weighing scale 1 is in weighing mode, which means that a load-receiving area 8, a weight/price display field 9 and a group of function keys 10 (for example "Print", "Tare" and "Clear") are visually delineated and functionally activated on the panel 3, 7. A weighing object 11 is sitting on the load-receiving area 8, for example a container that the operator may fill with a quantity of seafood selected by the customer. A display unit 12 on the customer side 6 shows the weight, unit price, and actual price to be paid. Instead of the display unit 12, a digital projector (not shown in the drawings) could be attached to, or integrated in, the weighing scale 1 in order to generate a projected image of the information of interest to the customer, for example on the glass surface of a display case behind which the weighing scale 1 is set up.

Figure 2A:
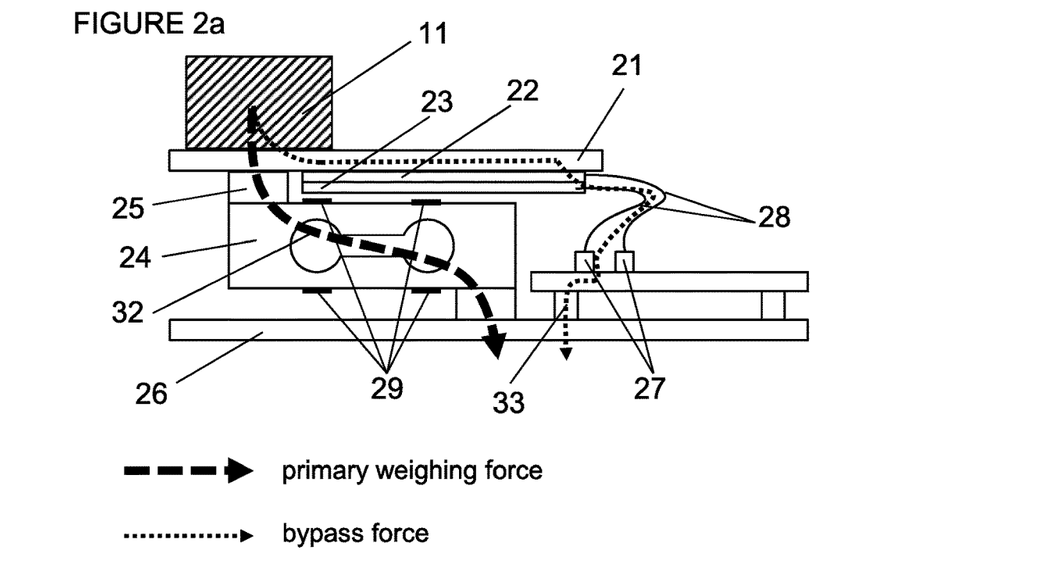
FIG. 2*a* illustrates the problem of mechanical bypass forces that can be caused by internal cable connections in a weighing scale.

FIG. 2*a* illustrates the problem of mechanical bypass forces that can be caused by internal cable connections in a weighing scale 1 in which the load-receiving platform 3 is configured as a layered assembly of a protective glass plate 21, a capacitive (PCAP) touchscreen 22 and a color LCD display 23. The load-receiving platform 3 is coupled to the weighing cell 24 by way of a force-transmitting connection 25. The weighing cell 24 is mounted on a chassis or base structure 26 which is part of the housing 2. The primary weighing force (symbolized by the dashed line 32 ending in an arrowhead) is transmitted from the weighing object 11 through the weighing platform 21, the force-transmitting connection 25, the weighing cell 24, and the chassis base 26 into a supporting surface on which the weighing scale 1 is set up. By way of cables 28, the capacitive (PCAP) touchscreen 22, the color LCD display 23 and the weighing cell 24 are electrically connected to internal operating components of the weighing scale 1, in particular analog and digital circuit modules 27. The randomly curved solid lines 28 represent conventional ribbon cables selected and laid out without regard to the bypass forces (symbolized by the dotted line 33 ending in an arrowhead) that are transmitted through the electrical connections 28 as the load-receiving platform 3 moves up and down slightly when a weighing load 11 is set on, or removed from, the weighing platform 3. As explained previously herein, the bypass forces 33 can cause weighing errors due to the non-elastic behavior of the cable insulation and other unpredictable and uncontrollable influence factors inherent in a random, floppy layout of the cables 28. This problem has been solved by the invention as illustrated in one of the following examples in FIGS. 2b to 2f.

Figure 2B:
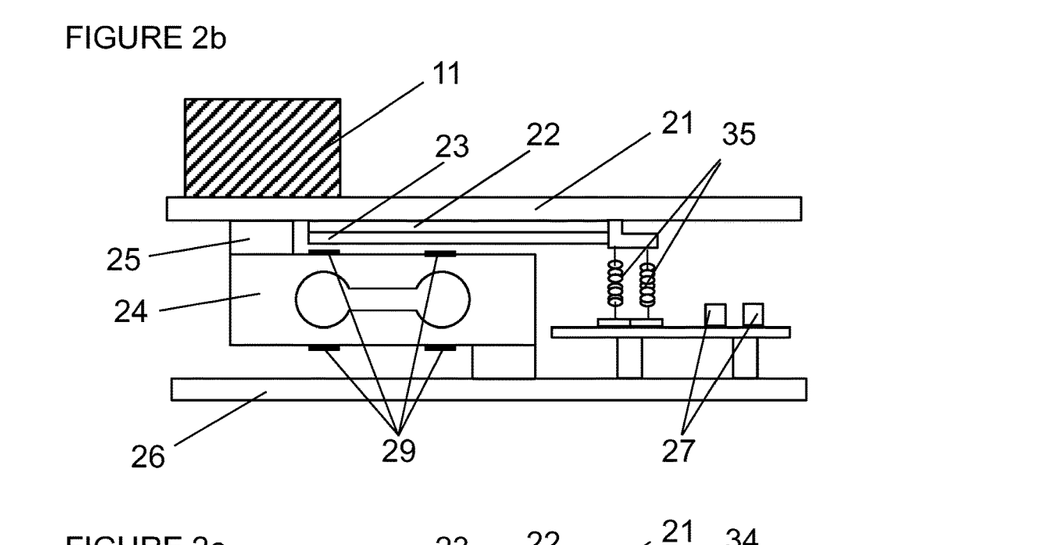
FIGS. 2*b* to 2*f* illustrate different embodiments of a weighing scale in accordance with the invention.

FIG. 2b shows a first example of the constructive features which, in accordance with the invention, are employed to eliminate the harmful influence of bypass forces. The cable connections of FIG. 2a have been replaced by coil springs 35 whose elastic spring tension superimposes itself in a predictable and reproducible manner on the primary weighing force and can therefore be cancelled out in the calibration of the weighing scale 1.

Figure 2C:
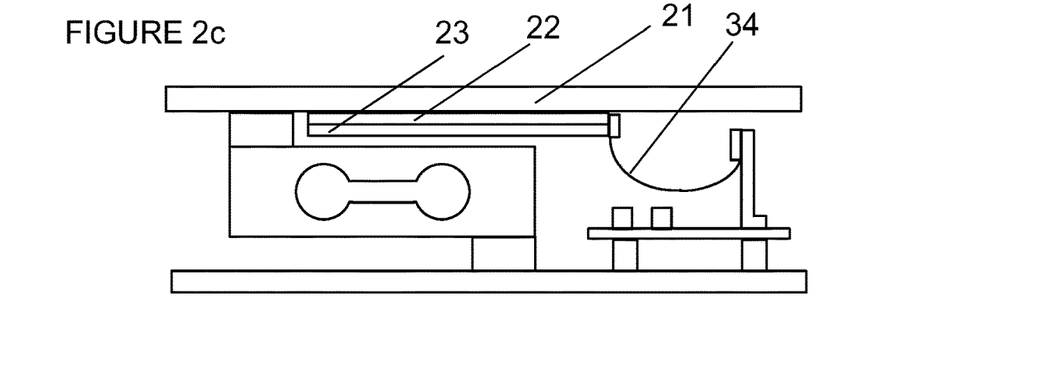

FIG. 2c shows a second example of the constructive features which, in accordance with the invention, are employed to eliminate the harmful influence of bypass forces. Instead of using the conventional ribbon cables of FIG. 2a, consisting of parallel wires embedded in a heavy rubber-like plastic insulation material, the electrical connections between the touchscreen/display and the analog and digital modules of the weighing scale 1 are realized in the form of a plurality of conductive traces on a thin flexible foil ribbon 34, and instead of a randomly curved shape the flexible foil ribbon 34 is suspended in the form of a catenary curve between the touchscreen/display which is integrated in the load-receiving, moving part and a stationary suspension point that is immovably positioned relative to the chassis base 26 of the weighing scale 1.

Figure 2D:
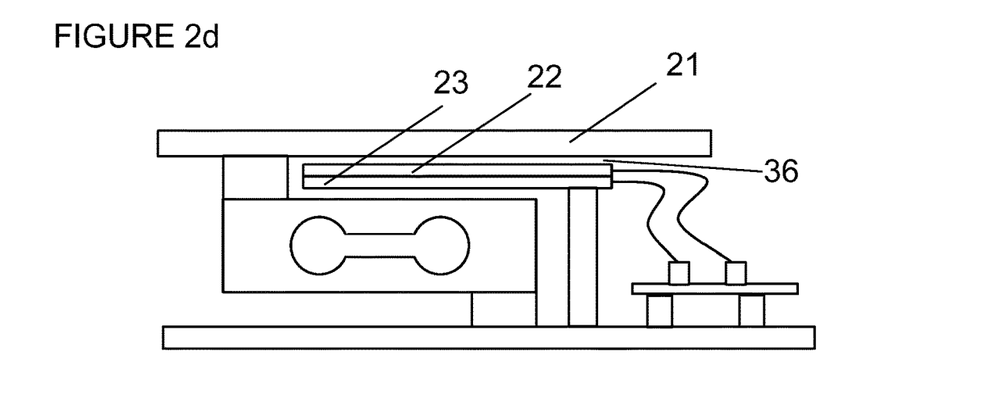

FIG. 2d illustrates an embodiment of the invention, where the touchscreen 22 and the LCD display 23 are physically separated from the protective glass plate 21 by a small air gap 36 and are installed in a fixed position relative to the housing. As the applicant has found through experiments, it is feasible to provide a PCAP touch screen 22 that is responsive to finger touch even across an air gap 36. Since the touchscreen/display 22, 23 as well as the analog and digital modules 27 are non-movable parts, the cable connection between them can be conventionally designed, since no bypass force can occur in this case.

Figure 2E:
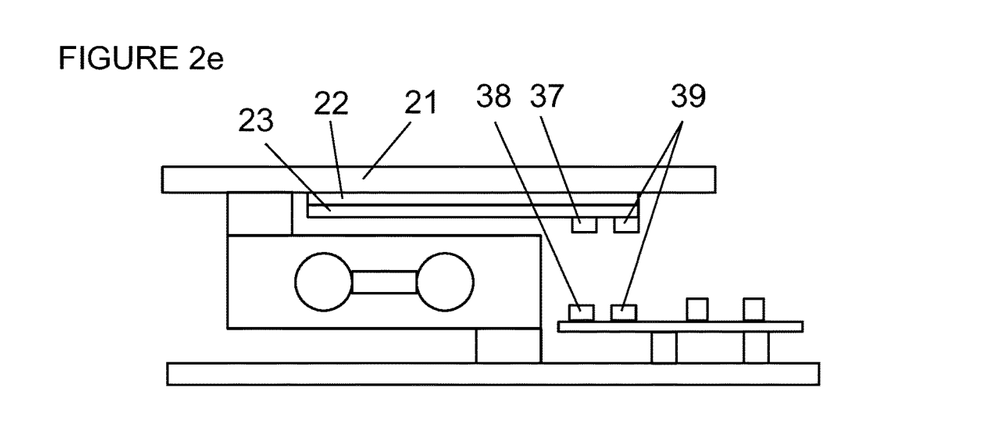

FIG. 2e schematically illustrates an embodiment of the invention, where wireless connections are used to transmit electrical energy as well as to exchange data signals between the chassis based-parts 27 and the touchscreen/display 22, 23. Symbolically indicated are a sender 38 and receiver 37 of electrical energy as well as send/receive elements 39 for a bidirectional data exchange.

Figure 2F:
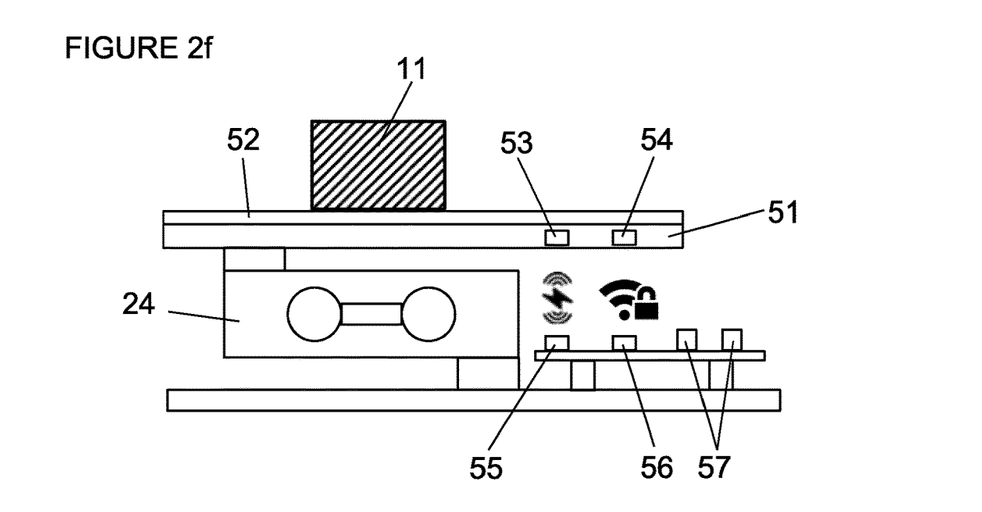

FIG. 2f schematically illustrates an embodiment of the invention, where a commercially available tablet computer 51, 52 is integrated in the weighing platform, wherein block 51 includes all of the electronics, the display and the battery, while block 52 represents a capacitive touch sensor. The top surface of the capacitive touch sensor 52 simultaneously functions as load-receiving surface for the weighing object 11. The tablet computer is programmed to perform all of the digital processing functions of the weighing scale including the receiving and processing of digital weighing results from the weighing cell 24, displaying and controlling the touch keyboard and display, receiving user commands through the capacitive touch sensor 52, and interacting with a printer, while the top surface of the capacitive touch sensor 52 simultaneously serves as load-receiving surface for the weighing object 11. Power is transmitted from a contact-free wireless charger 55 mounted in the base 26 of the weighing scale to an energy-receiver unit 53 built into the tablet computer 51. Raw digital weighing data are transmitted from the weighing cell 24 to the tablet computer 51 by way of a secure wireless data interface from a data sender unit 56 to a data receiver unit 54.

Figure 3:
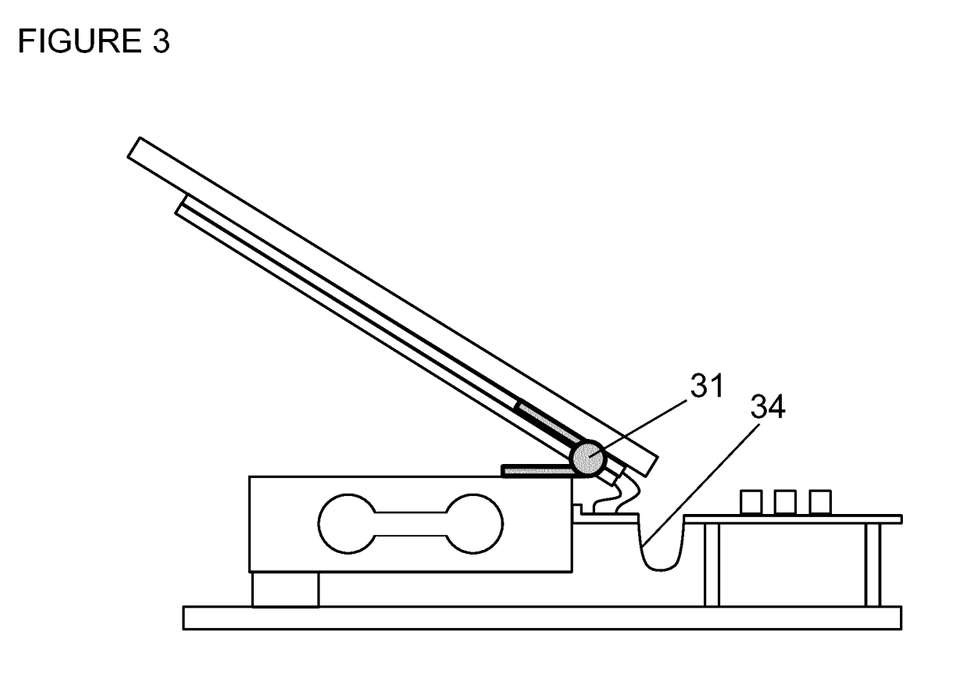
FIG. 3 represents a schematic side view of the weighing scale according to the invention with a hinge that allows the load-plate/touchscreen/display panel to be raised and lowered.

In the example of FIG. 3, the force-transmitting mechanical connection 25 between the load-receiving platform 3 and the weighing cell 24 contains a hinge 31 which allows the load-receiving platform 3 to be raised and lowered like a hinged lid on the enclosure 2 of the weighing scale 1. This arrangement allows convenient access to the internal components 27 of the weighing scale 1 without the need to disconnect the load-plate/touchscreen/display 3, 22, 23 mechanically and electrically from the weighing cell 24 and the internal components 27. As a particular advantage, the hinged connection 31 of the platform 3 allows a service technician to conveniently perform function checks on the touchscreen display 22, 23 while working on the internal components 28 of the weighing scale 1. The illustrated example in FIG. 3 shows a flexible foil ribbon connection 34 between the load-receiving movable part of the weighing scale 1 and the stationary electrical modules 27. However, this electrical connection could also be realized in any of the other ways described above.

In the examples of FIGS. 2 and 3, the weighing cell 24 is a so-called single-point load cell of the type known as double bending beam, with strain gauges 29 applied at the bending locations shown in the drawing. It should be noted however, that the inventive concept of integrating a touchscreen display 22, 23 in the load-receiving platform 3 can be realized without limitation in regard to the kind of weight-sensing technology being employed, as long as it produces a digital electronic weight signal. For example, the load-receiving platform 3 could be supported by four load cells at the platform corners, analogous to the arrangement in U.S. Pat. No. 9,092,050 B2 and U.S. Pat. No. 9,410,841 B2, or by a so-called gauged plate as described in U.S. Pat. No. 4,506,746, wherein four bending-beam load cells are integrally incorporated at the corners of a flat metal plate. Furthermore, there are other weight-sensing technologies that could be considered besides strain gauge load cells. This includes for example a weighing cell based on the principle of magnetic force compensation, a vibrating wire sensor, or a piezo-electric force sensor.

Figure 4A:
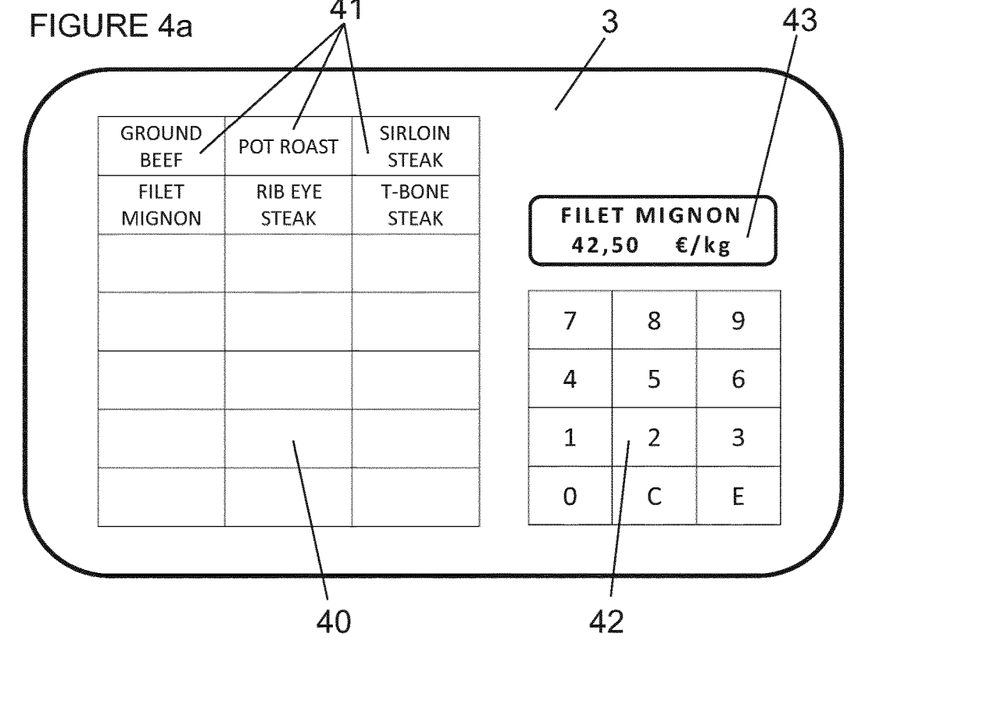
FIG. 4*a* shows a plan view of the touch field array which appears on the load-plate/touchscreen/display panel in the operator input mode of the weighing scale according to the invention.

FIG. 4a shows an example of a touch field array 40 that could be displayed on the surface of the load-receiving platform 3 in the operator input mode of the weighing scale 1. Typically, such a touch field array 40 includes product keys 41 labelled with names or images of the different products that are sold by weight, for example ground beef, steak, filet mignon, pork chops, etc. In addition, a set of number keys 42 allows the operator to enter PLU (Product Look-Up) numbers for any products that that are not included among the specifically labelled product keys. The product display window 43 displays the name of the selected product, and the "Clear" key allows the operator to cancel an erroneous entry. Having made a product selection either with a product key 41 or PLU number keys 42, the operator touches an "Enter" key, which concludes the input phase and causes the touchscreen/display 22, 23 to change to the weighing mode.

Figure 4B:
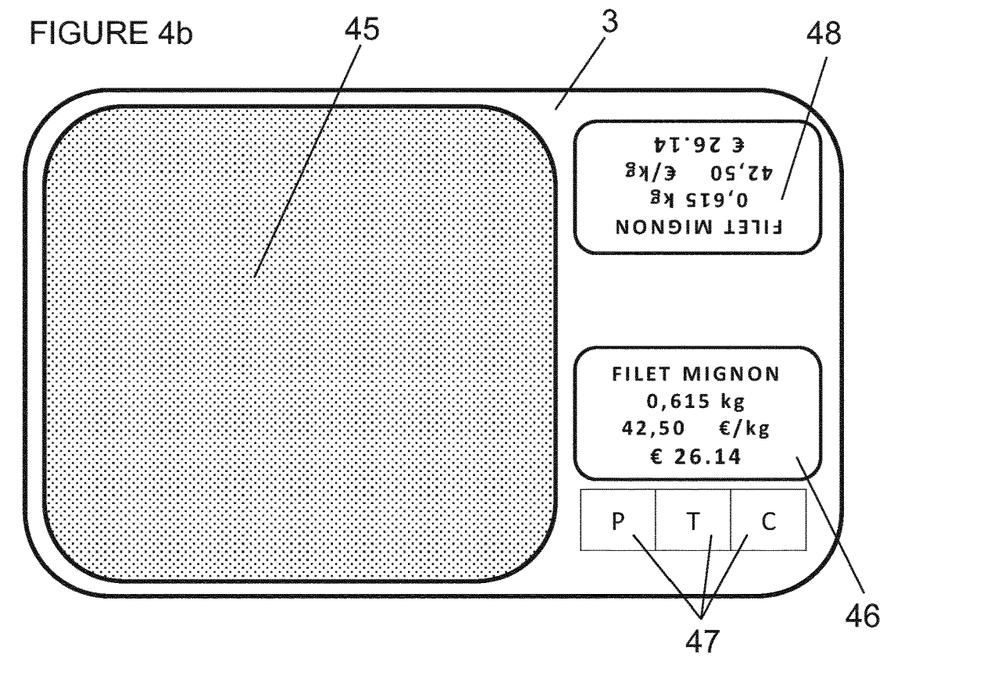
FIG. 4*b* shows a plan view of the demarcated load area, the weight/price display and the function key touch fields which appear on the load-plate/touchscreen/display panel in the weighing mode.

FIG. 4b shows an example of a screen image that is displayed on the surface of the load-receiving platform 3 in the weighing mode. The left-hand portion of the touchscreen display panel 22, 23 as seen by the operator is visually delineated as load-receiving area 45 for the merchandise to be weighed, while the right-hand portion of the panel 22, 23 contains an operator display window 46 showing the weight, the unit price and the price to be paid for the merchandise that is being weighed on the scale 1. In addition, function keys 47 (for example "Print", "Tare" and "Clear") are visually delineated and functionally activated on the panel 22, 23. Furthermore, the screen image for the weighing mode could also include a customer display window 48, essentially a duplicate of the operator display window 46 turned upside down so that it faces the customer.

It should be kept in mind that the images of touch keys 41, 42, 47, load-receiving area 45, display windows 46, 48, or any other desired images, as well as the ability of touch fields 41, 42, 47 to respond to finger contact, are functions controlled by a program in the processor unit. There are unlimited possibilities for the design of the appearance and functionality of the touchscreen display 22, 23, and it should be self-evident that the invention is not limited to the examples herein described and illustrated.

Figure 5:
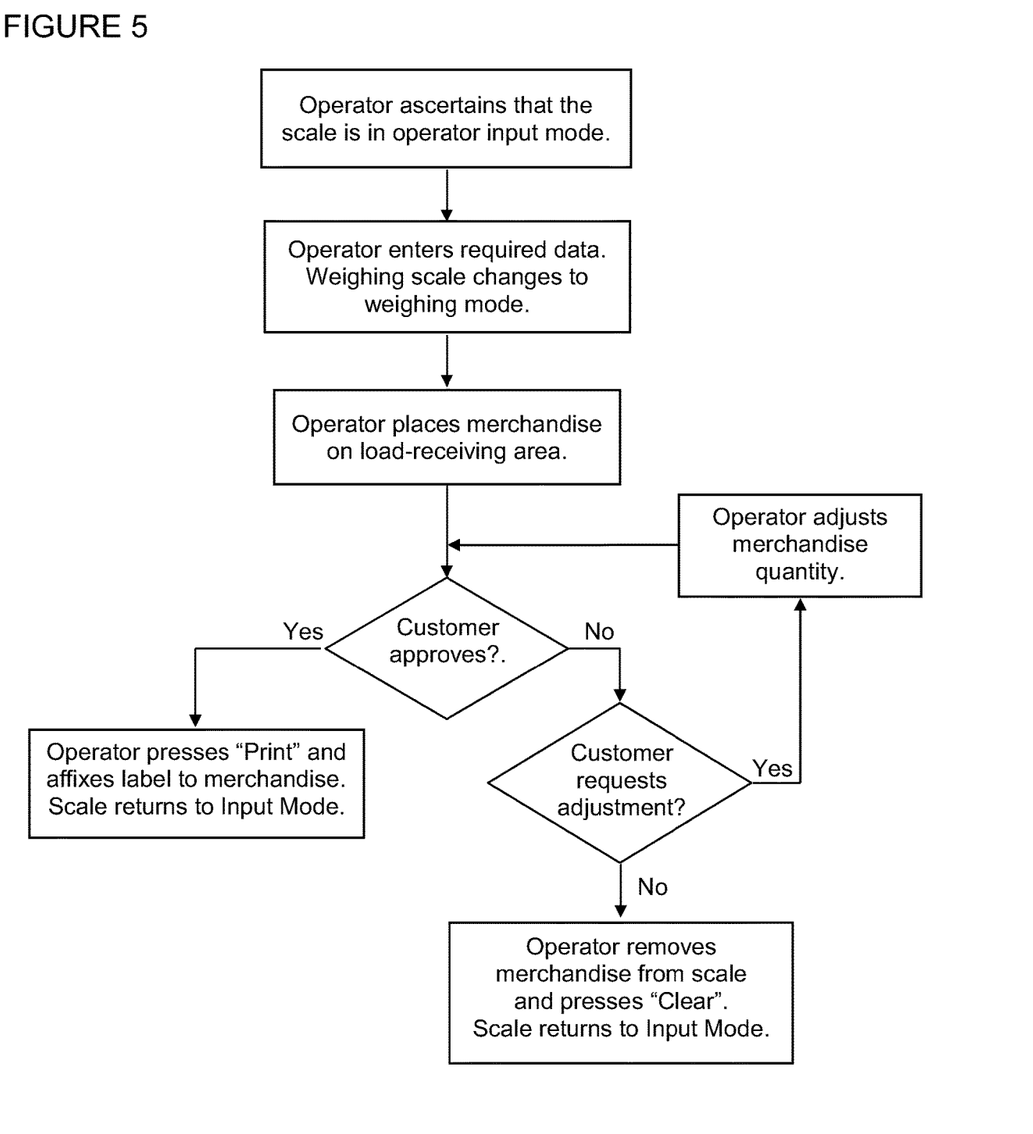
FIG. 5 shows a flowchart of the sequential order of steps in a weighing transaction using the weighing scale according to the invention.

FIG. 5 shows a flowchart illustrating the sequential order of steps in a weighing transaction between a vendor and a customer using the weighing scale 1 as described and illustrated herein.

While the invention has been described through the presentation of specific embodiments, it is considered self-evident that numerous additional variants are encompassed by the teachings of the present invention, for example by combining the features of the individual embodiments with each other, exchanging individual functional units of the embodiments against each other, or using the same features in different forms of material realization. Such combinations and variations of the concepts described and claimed herein are considered to fall within the scope of protection that is hereby sought for the present invention.

LIST OF REFERENCE SYMBOLS

- 1 weighing scale
- 2 housing
- 3 load-receiving platform
- 4 printer
- 5 operator side
- 6 customer side
- 7 touchscreen/display panel
- 8 load-receiving area
- 9 weight/price display field
- 10 function keys
- 11 weighing object
- 12 customer display unit
- 21 protective glass plate
- 22 capacitive (PCAP) touchscreen
- 23 color LCD display
- 24 weighing cell
- 25 force-transmitting connection
- 26 chassis base structure
- 27 analog and digital modules
- 28 cable connections
- 29 strain gauges
- 31 hinge
- 32 primary force path
- 33 bypass or shunt force path
- 34 flexible foil ribbon
- 35 electrical connections in the form of coil springs
- 36 air gap
- 37 receiver element for power transmission
- 38 sender element for power transmission
- 39 bidirectional send/receive elements for data interchange
- 40 touch field array
- 41 product keys
- 42 PLU number entry keys
- 43 product display window
- 45 load-receiving area
- 46 operator display window
- 47 function keys
- 48 customer display window
- 51 tablet computer
- 52 capacitive touch sensor of 51
- 53 wireless energy receiver
- 54 wireless data receiver unit
- 55 wireless remote charger
- 56 wireless data sender unit

The invention claimed is:

1. A weighing scale for use on a retail store counter, comprising:
   a housing;
   a load-receiving platform that is arranged on top of the housing; and
   operating components that are enclosed in the housing, comprising:
      at least one weighing cell;
      a load-transmitting mechanical connection that couples each weighing cell to the load-receiving platform;
      analog and digital weighing electronics that are operable to convert electrical weight signals of each weighing cell into digital weighing results; and
      a central processing unit which is operable to lend program-controlled functionality to the weighing scale, and
   a touchscreen display panel which is operable to display information to, and receive input from, a human operator, the touchscreen display panel comprising a layered arrangement in which a protective glass plate, a projected capacitive (PCAP) touch screen with a plurality of touch-sensing points, and a liquid crystal display are arranged on top of each other, such that at least a part of the touchscreen display panel is integrated in the load-receiving platform in horizontal orientation, with a top surface of the glass plate exposed and facing the human operator, and further that constructive features are present to prevent the occurrence of weighing errors due to electrical connections causing mechanical bypass forces between said at least one part of the touchscreen display panel that is integrated in the load-receiving platform and the operating components that are installed in the housing, wherein the top surface of the protective glass plate is operable to perform three functions, namely a first function as load-receiving surface of the weighing scale on which merchandise to be weighed can be placed by the human operator, a second function as touch field keyboard through which inputs are communicated to the weighing scale by the human operator, and a third function as display window through which information is delivered by the weighing scale to the human operator, and that, consequently, said layered assembly forms a combined load plate/touchscreen/display panel.

2. The weighing scale of claim 1, wherein said constructive features comprise a flexible conductor between the load-receiving platform and the operating components that are installed in the housing, wherein said flexible conductor is configured as a spring element with an elastic restoring force that superimposes itself on the weighing force in a predictable and reproducible manner so that the influence of the flexible conductor will be cancelled in a calibration of the weighing scale.

3. The weighing scale of claim 1, wherein said constructive features comprise an arrangement without an electrical connection between the load-receiving platform and the operating components that are installed in the housing, wherein the protective glass plate is integrated in the load-receiving platform while the PCAP touch screen and the liquid crystal display are installed in the housing, separated by an air gap from the glass plate.

4. The weighing scale of claim 1, wherein, for an arrangement wherein the protective glass plate, the PCAP touch screen and the liquid crystal display are integrated in the load-receiving platform, said constructive features comprise wireless sending and receiving means for a wireless transmission of power and data between the load-receiving platform and the operating components that are installed in the housing.

5. The weighing scale of claim 1, wherein the central processing unit is operable to receive and process the digital weighing results from the weighing electronics, to receive and process operator inputs in the form of touchscreen entries, and to generate alphanumerical and pictorial displays of information on the load-plate/touchscreen/display panel, the central processing unit being programmed to distinguish between intentional touchscreen inputs by the operator and unintended touchscreen actions resulting from a load being placed on the load-receiving platform.

6. The weighing scale of claim 1, wherein the central processing unit is operable to ignore touchscreen inputs from one or more of the touch-sensing fields after at least one of:
the presence of a stable load on the load-receiving platform has been detected by the at least one weighing cell; and
said one or more touch-sensing fields have been touched for a duration exceeding a predetermined time limit.

7. The weighing scale of claim 5, wherein the central processing unit is operable to control the load-plate/touchscreen/display panel according to two different operating modes, namely:
an operator input mode in which a full-screen image of a user interface comprising a touch-field array is presented on the load-plate/touchscreen/display panel and operable to receive inputs from the operator, and
a weighing mode in which a two-part image is presented on the load-plate/touchscreen/display panel, comprising a first part visually defined as load-receiving area for the merchandise to be weighed, and a second part comprising an operator display window operable to display information that is generated by the weighing scale in the weighing mode, including in particular the weight and price to be paid for the merchandise being weighed.

8. The weighing scale of claim 7, wherein the second part further comprises one or more touch fields operable as function keys to receive operator inputs that are relevant to the weighing mode, including in particular a "Print" key for sending a print command to a label printer that is operatively connected to the weighing scale, a "Tare" key for cancelling out the weight of packaging material or a container, and a "Clear" key for commanding the weighing scale to return to the operator input mode and/or the second part further comprises a customer display window arranged for viewing by a customer, oriented upside-down in relation to the operator display window, and operable to display information that is relevant to the customer, including in particular the weight, the unit price, and the price to be paid for the selected quantity of merchandise on the weighing scale.

9. The weighing scale of claim 7, further comprising an additional display unit, separate from the load-receiving platform, that is operatively connected to and/or integrated in the weighing scale, arranged and oriented for viewing by a customer, and operable to display information that is relevant to the customer, including in particular the weight, the unit price, and the price to be paid for the selected quantity of merchandise on the weighing scale.

10. The weighing scale of claim 7, further comprising a digital projector, attached to, or integrated in, the weighing scale to project an image of the information of interest to the customer onto a surface that is in the customer's field of view.

11. The weighing scale of claim 7, wherein the central processing unit is programmed to activate the operator input mode on start-up and every time after a previous transaction has been completed, but in either case only if no load on the load-receiving platform is detected by the at least one weighing cell and/or the central processing unit is programmed to activate the weighing mode after touchscreen entries by the operator in the operator input mode have been completed.

12. The weighing scale of claim 1, wherein one or more of the operating components of the weighing scale, including the central processing unit, are incorporated in the load-receiving platform together with the touchscreen display.

13. The weighing scale of claim 12, further comprising a tablet computer, integrated in the weighing platform and programmed to perform all of the digital processing functions of the weighing scale including the receiving and processing of digital weighing results from one or more appropriately equipped weighing cells, displaying and controlling the touch keyboard and display and interacting with a printer, while the screen surface of the tablet computer also serves as load-receiving surface of the weighing scale.

14. The weighing scale of claim 13, wherein the tablet computer is powered by its built-in battery and the transmission of the digital weighing results from the one or more weighing cells as well as the data exchange with external devices is realized by using the built-in networking capabilities of the tablet computer.

15. The weighing scale of claim 1, wherein the load-transmitting mechanical connection between the load-receiving platform and the at least one weighing cell comprises a hinge which allows the load-receiving platform with the integral load-plate/touchscreen/display panel to be raised and thereby to provide access to the internal components.

16. A method of operating the weighing scale of claim 1 to carry out a transaction, comprising the steps of:
ascertaining that the scale is in an operator input mode;
entering, while in the operator input mode, required data through the touch-field array which is presented on the load-plate/touchscreen/display panel, such that, when the data entry has been completed, the weighing scale changes to a weighing mode;
placing, while in the weighing mode, the merchandise on the load-receiving area of the load-plate/touchscreen/display panel;
displaying the weight/price information in the customer display window or the additional customer display unit, until one of the following substeps occurs:
approving the transaction by pressing the "Print" field, causing the operatively connected printer to deliver a label for affixation to the merchandise, and removing the merchandise from the weighing platform, causing the weighing scale to return to the operator input mode, adjusting the quantity of merchandise on the load-receiving area and proceeding at the "placing" step; or declining the transaction by removing the merchandise from the weighing platform, and pressing the "Clear" field, causing the weighing scale to return to the operator input mode.

\* \* \* \* \*